3,332,010
CIRCUIT ARRANGEMENT FOR MEASURING A PHASE DIFFERENCE BETWEEN TWO ALTERNATING CURRENT QUANTITIES
Karl Schoeps and Willy Küsters, Karlsruhe-Durlach, Germany, assignors to Schall-Technik Dr.-Ing. Karl Schoeps, Karlsruhe-Durlach, Germany
Filed Jan. 10, 1964, Ser. No. 337,007
Claims priority, application Germany, Feb. 21, 1963, Sch 32,822
13 Claims. (Cl. 324—57)

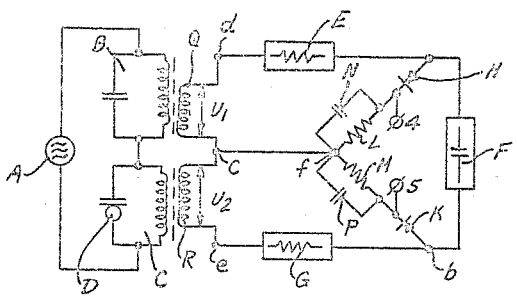
FIG. 1
FIG. 2
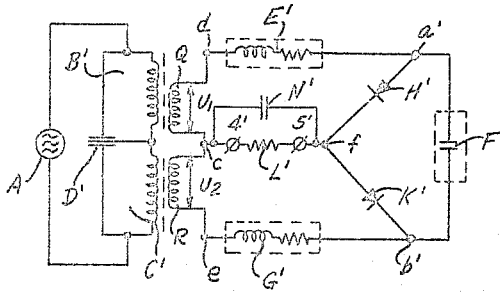
FIG. 4
FIG. 5
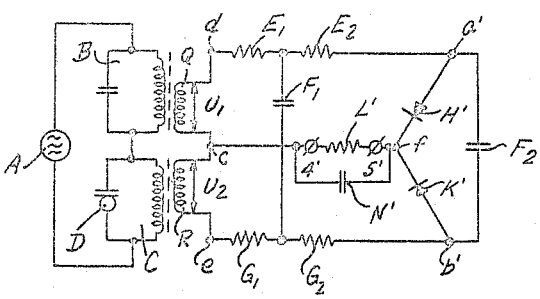
FIG. 6
INVENTORS
Karl Schoeps
Willy Küsters
BY Michael S. Striker INVENTORS
Karl Schoeps
Willy Küster
BY
Michael S. Striker
Attorney

United States Patent Office 3,332,010
Patented July 18, 1967

The present invention concerns a circuit arrangement for measuring the phase difference or the phase angle between two alternating current quantities. The arrangement according to the invention is particularly applicable to capacitor microphone arrangements.

Up to now capacitor microphones are operated almost exclusively within so-called low frequency circuit arrangements. Apart from this, a high frequency circuit arrangement for the same purpose is well known as proposed by Riegger. However, as long as this type of circuit arrangement was constructed only with electron tubes it has not played any significant role in practice because of the rather involved and expensive structure thereof.

Now, with the remarkable development of semi-conductor technique conditions have changed considerably. The characteristic advantage derived from the use of transistors or other suitable semi-conductor elements is the possibility of operating these elements with a single, comparatively low voltage. Since the input impedance of these elements is small relative to the very high capacitive impedance of a capacitor microphone, the use of transistors or semi-conductor elements is impossible within a low frequency circuit arrangement. On the other hand, this difficulty is not present within high frequency circuit arrangements designed for operating with capacitor microphones.

However, new difficulties arise in these arrangements on account of the noise characteristics of the transistors or other suitable semi-conductor elements provided that it is intended to provide for a satisfactory ratio between the signal voltage and the noise voltage of the circuit arrangement.

It may be mentioned that in addition to the well known high frequency circuit arrangement according to Riegger also other high frequency circuit arrangements are known which include one or more discriminators based on the Riegger circuit. It is also known to arrange two discriminator circuits in such a manner that the noise caused by the oscillator is compensated. However, in these known circuit arrangements the noise caused by the rectifiers which are indispensible in high frequency circuit arrangements is fully effective because the fundamental principles of these high frequency arrangements requires that the high frequency voltages applied to the rectifiers are of comparatively great magnitude.

Attempts have been made for reducing also the noise caused by the rectifiers, and thus a high frequency circuit arrangement has been proposed in which the voltage applied to the rectifiers are reduced by producing a voltage difference. These formation of a voltage difference is carried out by subtracting from the high frequency voltages derived from oscillatory circuits a high frequency voltage of smaller amplitude which is not modulated or only slightly modulated. In this known circuit arrangement, any variation of the controlling quantity is indicated by utilizing one flank of the resonance curve and as the result of tuning two oscillatory circuits to a frequency different from that of the oscillator. A disadvantage of this arrangement is that in view of the classical shape of a resonance curve and in view of the otherwise appearing great non-linear distortions, a satisfactory efficiency can be obtained only if the range of tunability of the arrangement is greatly reduced.

It is therefore one of the objects of this invention to provide for a circuit arrangement of the general type mentioned above which avoids the disadvantages of the known circuit arrangements of this kind.

It is another object of this invention to provide for a circuit arrangement of the type set forth which is comparatively simple in structure and entirely reliable in operation.

With above objects in view the invention includes a circuit arrangement for measuring the phase difference between two alternating current quantities, particularly applicable to capacitor microphone arrangements, comprising, in combination, oscillator means for producing a primary voltage at a predetermined frequency; two oscillatory circuit means operatively connected with said oscillator means and having each normally a resonance frequency substantially equal to said predetermined frequency for furnishing normally a first and a second output frequency, respectively, equal to each other and in phase with each other, at least one of said oscillatory circuit means including means for causing a variation of said resonance frequency thereof so as to produce a phase difference between said first and second output frequencies, such phase difference corresponding to said variation of said resonance frequency; and circuit means including first rectifying circuit means connected for rectifying said first output frequency, second rectifying circuit means connected for rectifying said second output frequency, impedance means connected in parallel with both said rectifying circuit means, and means for permitting detection of any difference between the direct current quantities simultaneously appearing at a given moment in said first and second rectifying circuit means, respectively, such difference corresponding to, and indicating, the magnitude of a phase difference between said first and second output frequencies caused by said variation of said resonance frequency.

Of course, the circuit arrangement according to the invention may be constructed either in such a manner that the two oscillatory circuit means, or at least one thereof, are connected for determining the frequency of the oscillator, or that the two oscillatory circuits are tuned to a resonance frequency equal to the predetermined frequency of a self-excited oscillator.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a schematic circuit diagram illustrating one embodiment of the invention;

FIG. 2 is a vector diagram illustrating the operation according to FIG. 1;

FIG. 4 is a schematic circuit diagram illustrating a modification of the embodiment according to FIG. 1;

FIG. 5 is a vector diagram illustrating the operation of the arrangement according to FIG. 4;

FIG. 6 is a schematic circuit diagram illustrating a modification of the embodiment according to FIG. 4, the operation thereof being also illustrated by the vector diagram according to FIG. 5;

Figure 3:
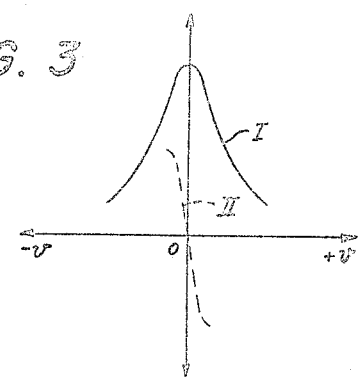
FIG. 3 is a diagram illustrating the resonance curve and the phase curve of an oscillatory circuit.

In FIG. 1 an oscillator A is provided which is operatively connected with two oscillatory circuits B and C. The oscillator A produces a primary voltage at a predetermined frequency and the two oscillatory circuits B and C are tuned to a resonance frequency equal to the frequency of the oscillator A. The capacitance of the oscillatory circuit C, is represented by a capacitor microphone D so that the resonance frequency of this oscillatory circuit is varied in rhythm with the membrane oscillations of the microphone D.

The remainder of the circuit arrangement comprises two circuit portions extending between a common terminal $c$ and an opposite end $a$ thereof via a midpoint $d$, in the one portion, and extending between the common terminal $c$ and the opposite end $b$ thereof via a midpoint $e$, in the other portion. An output voltage $u_1$ is derived from the oscillatory circuit B and applied to the circuit portion $c$–$d$–$a$ by means of an inductive coupling Q, while a second output voltage $u_2$ is derived from the oscillatory circuit C and transmitted to the circuit portion $c$–$e$–$b$ by means of the inductive coupling R. The circuit portion $c$–$d$–$a$ thus comprises in view of the coupling member Q the oscillatory circuit B and, in accordance with the described example, an ohmic resistance E. In a similar manner the circuit portion $c$–$e$–$b$ comprises in view of the coupling member R the oscillatory circuit C and additionally the ohmic resistance G.

Between the common terminal $c$ and the above mentioned points $a$ and $b$ a rectifying circuit arrangement is provided which is composed of a first rectifying circuit $a$–$f$–$c$ and including a rectifier H, and a second rectifying circuit $b$–$f$–$c$ including the rectifier K, as shown. The rectifying circuits mentioned above further include ohmic resistances L and M, respectively, which are shunted by capacitors N and P, respectively, for bypassing the high frequency. At the points 4 and 5 marked in FIG. 1 any difference between the direct current voltages simultaneously appearing at a given moment in the above mentioned first and second rectifying circuits can be tapped and used for instance as an indication of any variation of the phase relation between the output voltages $u_1$ and $u_2$ produced by the operation of the microphone D. Also, the points $a$ and $b$ are connected with each other via a capacitive reactance F.

Under the assumption that in the arrangement according to FIG. 1 the resistances E and G are equal to each other, and that the voltages $u_1$ and $u_2$ have the same amplitude and are in phase with each other, then the vector diagram according to FIG. 2 illustrates the voltages appearing in the operation of this arrangement. In this diagram the vector 6–1 illustrates the voltage across the ohmic resistance E, and the vector 2–7 illustrates the voltage across the ohmic resistance G. The voltage across the capacitive reactance F is illustrated by the vector 1–2. The voltage vector 1–3 applies to the rectifying circuit $a$–$f$–$c$ or H–L, while the voltage vector 3–2 applies to the rectifying circuit $b$–$f$–$c$ or K–M. If the two rectifying circuits are equal to each other and the rectifiers have the directions of conductivity as illustrated then the direct current voltage difference between the points 4 and 5 is zero. This shows that the noise components of the oscillator output are compensated.

If the capacitor microphone D shown by way of example as a means for changing the resonance frequency of the oscillatory circuit C is exposed to sound so that the membrane thereof is displaced, then the resonance frequency of the oscillatory circuit C is caused to be different from that of the oscillatory circuit B as a result of which a phase difference appears between the output voltages $u_1$ and $u_2$; the resulting variations of the magnitude of the voltages $u_1$ and $u_2$ or of the sum $u_1 + u_2$ are negligibly small because the corresponding phase angles are very small. However, as a result of the above-mentioned phase shift the junction point between $u_1$ and $u_2$ in the vector diagram moves from the location 3 to the location 3′. Consequently, a voltage illustrated by the vector 1–3′ appears in the rectifying circuit H–L, and a voltage corresponding to the vector 3′–2 appears in the rectifying circuit K–M, these two direct current voltages being different from each other so that now a corresponding voltage difference appears at the above-mentioned circuit points 4 and 5. This voltage difference corresponds to, and indicates, the magnitude of the phase difference between the first and second output frequencies or voltages $u_1$ and $u_2$ as caused by the variation of the resonance frequency of the oscillatory circuit C.

It can be seen from the above described vector diagram according to FIG. 2 that the voltages appearing at the rectifiers H and K, e.g. the voltage illustrated by the vectors 3′–2 can assume a value substantially equal to zero. This, however, means that any possibly appearing voltage difference can be fully utilized so that in this manner particularly favorable ratios between signal voltage and interference voltage (noise voltage) are obtained.

FIG. 3 illustrates the resonance curve I and the phase curve II of an oscillatory circuit as a function of frequency variations $v$. Since the oscillator circuits B and C are tuned to a resonance frequency equal to the output frequency of the oscillatory A the working point of the arrangement is located in the zero point of the phase curve II which is simultaneously also its point of symmetry. This results in a symmetrical tunability over the entire range of tunability together with a substantially linear characteristic of the operation so that a minimum of non-linear distortions can be expected. An added substantial advantage resides in the fact that in view of the greater steepness of the phase curve as compared with the corresponding resonance curve a substantially greater efficiency and consequently a further improvement of the ratio between signal voltage and voltage is obtained.

Particularly favorable conditions exist if the elements of the circuit arrangement are so chosen and dimensioned that in the corresponding vector diagram the vector representing the voltage across the impedance F is oriented at a right angle relative to the direction of the vector representing the voltage sum $u_1 + u_2$ as illustrated in FIG. 5. Thus, FIG. 4 illustrates by way of example a circuit arrangement of this particular type. The arrangement is generally similar to that of FIG. 1. However, in this case it is assumed that the oscillatory circuits B′ and C′ are controlled by the phenomenon to be measured or indicated via a differential capacitor, e.g. a capacitor microphone D′ operating in push-pull fashion. In order to obtain a function as illustrated by the vector diagram according to FIG. 5, the impedances E and G may be composed each of a combination of a non-reactive resistance and an inductive reactance, the inductive reactance portion having a value one-half of the reactance value of the capacitive reactance F. By such an arrangement the voltage vectors 6–1' and 2'–7 are caused to assume the positions illustrated in FIG. 5. The vector 1'–2' again represents the voltage across the impedance F, and similar to the above description of FIG. 2 a phase shift of the output voltages $u_1$ and $u_2$ results in a movement of the point 3 to the point 3''. In view of the above it can be seen from FIG. 5 that in this case the voltage at the rectifiers H' and K' can be caused to assume exactly the value zero so that in this manner an optimum range of tunability is obtained.

The arrangement according to FIG. 4 differs from that illustrated by FIG. 1 in that a rectifier arrangement is provided from which the indication of the primary variation of the resonance frequency is obtained by the difference between the currents passing through the rectifiers H' and K' having the conductivity as shown, these currents being observable at the points 4' and 5' located on opposite sides of a resistance L' connected between the circuit points c and f and shunted by a capacitance N'.

It should be noted that a vector diagram according to FIG. 5 can be obtained also by arrangements different from that illustrated by FIG. 4. For instance a circuit arrangement according to FIG. 6 may be used which is yet modified against FIG. 4 only in some respects. In this case the desired phase angle of the voltage vector 1'–2' is obtained by sub-dividing the resistance E and G of FIG. 1 into resistances $E_1$, $E_2$ and $G_1$, $G_2$, respectively, and by connecting the junction points between these two pairs of resistances with each other across a second capacitive impedance $F_1$, or some other impedances or impedance combination. In this manner two RC-circuits $E_1$–$F_1$–$G_1$ and $E_2$–$F_2$–$G_2$, respectively, are created. It should be noted that the just-mentioned junction points do not coincide with the end points a' and b' of the two circuit portions carrying the output voltages $u_1$ and $u_2$, respectively.

Figure 7:
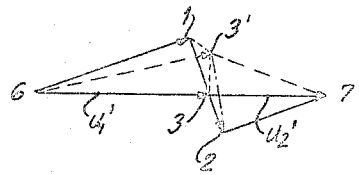
FIG. 7 is a vector diagram illustrating the operation of the embodiment according to FIG. 1 provided that the output voltages are of different magnitudes.

In the case that the output voltages $u_1'$ and $u_2'$ differ from each other in amplitude, then the resistances E and G in FIG. 1 should be dimensioned in proportion to the voltages $u_1'$ and $u_2'$, respectively, so that in this manner a vector diagram is obtained as illustrated by FIG. 7. It can be seen that in this case the operation is quite similar to that illustrated by the vector diagram according to FIG. 2.

Figure 8:
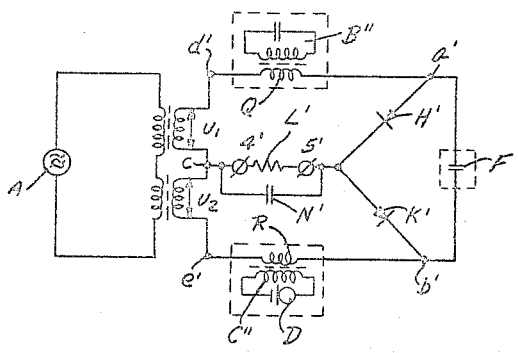
FIG. 8 is a schematic circuit diagram of an embodiment which differs from the arrangements according to FIGS. 1 and 4 mainly in that the oscillatory circuits are located in a different portion of the arrangement.
Figure 9:
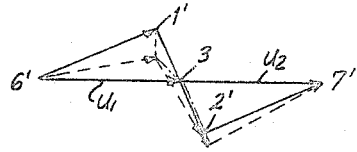
FIG. 9 is a vector diagram illustrating the operation of the arrangement according to FIG. 8.

The embodiment according to FIG. 8 mainly differs from that illustrated by FIG. 4 in that the output voltages $u_1$ and $u_2$ furnished by the oscillator A are impressed directly on the circuit portions c–d'–a' and c–e'–b', respectively. The oscillatory circuits B'' and C'' are inductively coupled with the above-mentioned circuit portions by the coupling devices Q and R, respectively, and constitute the only circuit components arranged in the above-mentioned two circuit portions. The vector diagram according to FIG. 9 illustrates the operation of the arrangement according to FIG. 8 and evidently does not require a further detailed description since it is quite analogous to the operation described further above.

Figure 10:
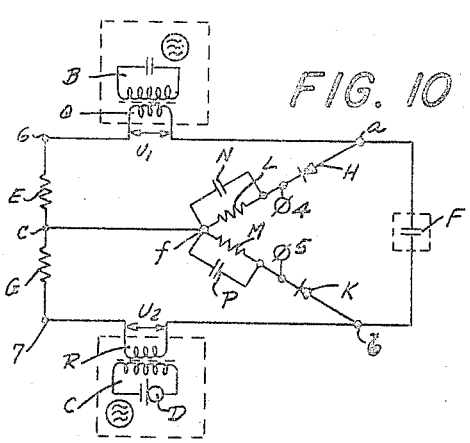
FIG. 10 is a schematic circuit diagram illustrating a modification of the arrangement according to FIG. 1, the location of the two oscillatory circuits and of certain resistances being exchanged against each other.
Figure 11:
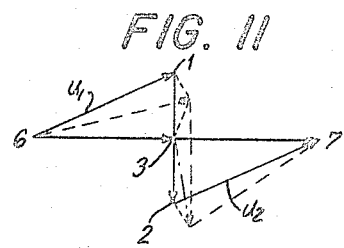
FIG. 11 is a vector diagram illustrating the operation of the arrangement according to FIG. 10.

The embodiment according to FIG. 10 is a modification of the arrangement according to FIG. 1. The main difference resides in the fact that the oscillatory circuits B and C which furnish via the coupling members Q and R, respectively, the output voltages $u_1$ and $u_2$ are located in the circuit portions c–d–a and c–e–b, respectively, at the places where in FIG. 1 the resistances E and G, respectively, are located, and vice versa. Of course in this case each of the oscillatory circuits B and C may be operatively connected with an individual oscillator or with a common oscillator A. The operation of the circuit arrangement according to FIG. 10 is illustrated by the vector diagram FIG. 11.

Figure 12:
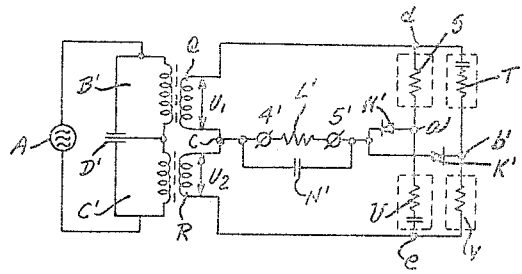
FIG. 12 is a schematic circuit diagram illustrating a modification of the arrangement according to FIG. 4, the difference being the arrangement of the impedance means in the circuit.
Figure 13:
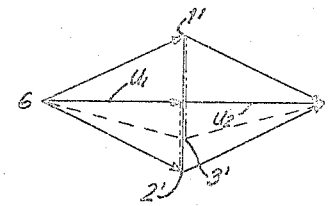
FIG. 13 is a vector diagram illustrating the operation of the arrangement according to FIG. 12.

It will be shown that the components of the first and second circuit portions c–d–a' and c–e–b', respectively, may at least partly be used as parts of the impedance means to be connected between the opposite ends of the first and second circuit portions. One example of such an arrangement is illustrated by FIG. 12. The general arrangement of this circuit corresponds to that of FIG. 4. However, the elements S and V which in this example are ohmic resistances serve also as the impedance combination connected between the end points a' and b' of the above-mentioned first and second circuit portions. However, this just-mentioned impedance combination is supplemented by the impedance combination U and T in such a manner that a bridge circuit is formed having two branches connected in parallel with each other and each branch being composed of two different series-connected impedances S, T and V, U, respectively. In this arrangement the components S and V are equal to each other and likewise the elements U and T are equal to each other. Consequently each diagonal point of the bridge circuit is a junction point between two different impedances, while on the other hand each of the parallel branches arranged between the points a' and b' are of identical construction. The vector diagram illustrating the operation of this arrangement is illustrated by FIG. 13.

Figure 15:
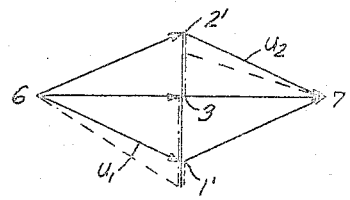
FIG. 15 is a vector diagram illustrating the operation of the arrangement according to FIG. 14.
Figure 14:
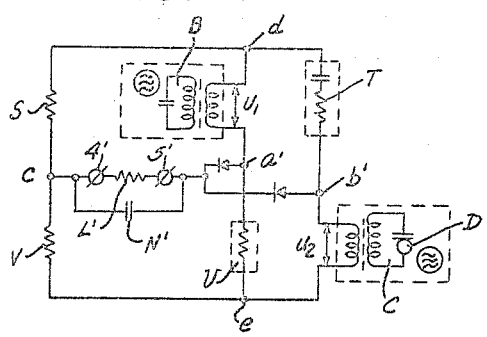
FIG. 14 is a schematic circuit diagram of a modification of the arrangement according to FIG. 12, the difference being that the location of the oscillatory circuits and of certain resistances in the circuits are exchanged against each other.

Finally, a modification of the circuit of FIG. 12 is illustrated by FIG. 14. The difference between the two circuit arrangements resides in the fact that in the circuit portions c–d–a' and c–e–b', respectively, the location of the oscillatory circuits and of the impedances S and V, respectively are exchanged against each other. It is of course assumed that in this case the variable capacitance D is operatively arranged only in one of the oscillatory circuits namely in the circuit C. Otherwise the above-given explanations apply analogously to FIG. 14. The function of the arrangement according to FIG. 14 is illustrated by the vector diagram of FIG. 15.

While in the above-described examples the means for varying the primary resonance frequency of at least one of the oscillatory circuits has been described by way of example as being a microphone of the capacitor type, it should be understood that the invention is not limited to the application of the above described circuits of the operation of capacitor microphones, but applies to all arrangements where it is desired to measure a phase difference or phase angle between two alternating current quantities.

It will be understood that each of the elements described above or two or more together, may also find a useful application in other types of circuit arrangements for measuring the phase difference between two alternating current quantities and differing from the types described above.

While the invention has been illustrated and described as embodied in circuit arrangements for measuring the phase difference between two alternating current quantities including two oscillatory circuit means and means for causing a variation of the resonance frequency of at least one of said oscillatory circuit means, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute the essential characteristics of the generic or specific aspects of this invention and, therefore, such adaptations should and are intended to be comprehended within the meaning and range of equivalence of the following claims.

What is claimed and desired to be secured by Letters Patent is:

1. Circuit arrangement for measuring the phase difference between two alternating current quantities, particularly applicable to capacitor microphone arrangements, comprising, in combination, oscillator means for producing a primary voltage signal at a predetermined frequency; two oscillatory circuit means operatively connected with said oscillator means and having each normally a resonance frequency substantially equal to said predetermined frequency for furnishing normally a first and a second output frequency signal, respectively, equal to each other and in phase with each other, at least one of said oscillatory circuit means including means for causing a variation of said resonance frequency thereof so as to produce a phase difference between said first and second output frequency signals, such phase difference corresponding to said variation of said resonance frequency; and circuit means including first rectifying circuit means connected for rectifying said first output frequency signal, second rectifying circuit means connected for rectifying said second output frequency signal, and means for permitting detection of any difference between the direct current quantities simultaneously appearing at a given moment in said first and second rectifying circuit means, respectively, such difference corresponding to, and indicating, the magnitude of a phase difference between said first and second output frequency signals caused by said variation of said resonance frequency.

2. Circuit arrangement for measuring the phase difference between two alternating current quantities, particularly applicable to capacitor microphone arrangements, comprising, in combination, oscillator means for producing a primary voltage signal at a predetermined frequency; two oscillatory circuit means operatively connected with said oscillator means and having each normally a resonance frequency substantially equal to said predetermined frequency for furnishing normally a first and a second output frequency signal, respectively, equal to each other and in phase with each other, at least one of said oscillatory circuit means including means for causing a variation of said resonance frequency thereof so as to produce a phase difference between said first and second output frequency signals, such phase difference corresponding to said variation of said resonance frequency; and circuit means including a first circuit portion having one end connected to carry said first output frequency signal and a second circuit portion having one end connected to carry said output frequency signal, said first and second circuit portions having a common terminal, first rectifying circuit means connected between said common terminal and the other end of said first circuit portion for rectifying said first output frequency signal, second rectifying circuit means connected between said common terminal and the other end of said second circuit portion for rectifying said second output frequency signal, impedance means connected in parallel with both said rectifying circuit means between said other ends of said first and second circuit portions, and means for permitting detection of any difference between the direct current quantities simultaneously appearing at a given moment in said first and second rectifying circuit means, respectively, such difference corresponding to, and indicating, the magnitude of a phase difference between said first and second output frequency signals caused by said variation of said resonance frequency.

3. Circuit arrangement for measuring the phase difference between two alternating current quantities, particularly applicable to capacitor microphone arrangements, comprising, in combination, oscillator means for producing a primary voltage signal at a predetermined frequency; two oscillatory circuit means operatively connected with said oscillator means and having each normally a resonance frequency substantially equal to said predetermined frequency for furnishing normally a first and a second output frequency signal, respectively, equal to each other and in phase with each other, at least one of said oscillatory circuit means including means for causing a variation of said resonance frequency thereof so as to produce a phase difference between said first and second output frequency signals, such phase difference corresponding to said variation of said resonance frequency; and circuit means including a first circuit portion having one end connected to carry said first output frequency signal and a second circuit portion having one end connected to carry said second output frequency signal, said first and second circuit portions having a common terminal and including reactive and non-reactive resistance portions, first rectifying circuit means connected between said common terminal and the other end of said first circuit portion for rectifying said first output frequency signal, second rectifying circuit means connected between said common terminal and the other end of said second circuit portion for rectifying said second output frequency signal, impedance means connected in parallel with both said rectifying circuit means between said other ends of said first and second circuit portions and so constructed that the ratio between the reactive and non-reactive resistance portions therein differs from the ratio between the reactive and non-reactive resistance portions of said first and second circuit portions, respectively, and means for permitting detection of any difference between the direct current quantities simultaneously appearing at a given moment in said first and second rectifying circuit means, respectively, such difference corresponding to, and indicating, the magnitude of a phase difference between said first and second output frequency signals caused by said variation of said resonance frequency.

4. An arrangement as claimed in claim 3, wherein said two oscillatory circuit means are so connected between said oscillator means and said first and second circuit portion, respectively, that said primary voltage is impressed on the latter across said oscillatory circuit means, respectively.

5. An arrangement as claimed in claim 4, wherein at least one of said oscillatory circuit means is connected so as to determine the frequency of said primary voltage of said oscillator means.

6. An arrangement as claimed in claim 3, wherein said first and second output frequencies are constituted by voltages of substantially equal amplitudes.

7. An arrangement as claimed in claim 3 wherein said first and second circuit portions each include a predetermined impedance, the reactive and non-reactive resistance portions being substantially the same in both said first and second circuit portions.

8. An arrangement as claimed in claim 3, wherein said impedance means connected in parallel with said two rectifying circuit means is at least substantially of purely reactive resistance type.

9. An arrangement as claimed in claim 8, wherein said reactive resistance portions of said first and second circuit portions are dimensioned each to amount to substantially one-half of said reactive resistance portion of said impedance means connected in parallel with said rectifying circuit means, and to determine a voltage thereacross appearing at a phase angle the sign of which is opposite to that of the phase angle applying to the voltage appearing across said reactive portion of said impedance means.

10. An arrangement as claimed in claim 3, wherein at least part of said reactive and non-reactive resistance portions of said first and second circuit portions are connected to serve as elements of said impedance means connected in parallel with said rectifying circuit means.

11. An arrangement as claimed in claim 10, wherein said impedance means comprise a bridge circuit including two branches connected in parallel with each other, each branch being composed of impedance members equal to those of the other branch.

12. An arrangement as claimed in claim 11, wherein each of said branches is composed of a series-combination of reactive and non-reactive resistance members, each diagonal point of said bridge circuit being a junction point between two different ones of said resistance members.

13. An arrangement as claimed in claim 3, wherein second impedance means are connected between a first junction point located in said first circuit portion between said common terminal and said other end of said first circuit portion, on one hand, and a second junction point located in said second circuit portion between said common terminal and said other end of said second circuit portion.

References Cited

UNITED STATES PATENTS

| | | | |
|---|---|---|---|
| 2,329,528 | 10/1943 | Grave | 324—119 |
| 2,340,609 | 2/1944 | Mestas | 324—57 X |
| 2,426,204 | 8/1947 | Grieg | 324—119 X |
| 2,540,660 | 2/1951 | Dreyfus | 324—77 X |
| 2,603,748 | 7/1952 | Bell. | |
| 2,607,890 | 8/1952 | Petroff | 324—78 X |
| 2,968,031 | 1/1961 | Hega | 324—83 X |
| 3,020,476 | 2/1962 | Jacoby | 324—61 |

FOREIGN PATENTS 144,318    6/1962    U.S.S.R.

RUDOLPH V. ROLINEC, *Primary Examiner.*

WALTER L. CARLSON, *Examiner.*

E. E. KUBASIEWIEZ, *Assistant Examiner.*